Dec. 3, 1963      R. GREINER      3,112,874
NAVIGATIONAL AID
Filed Nov. 26, 1962      2 Sheets-Sheet 1
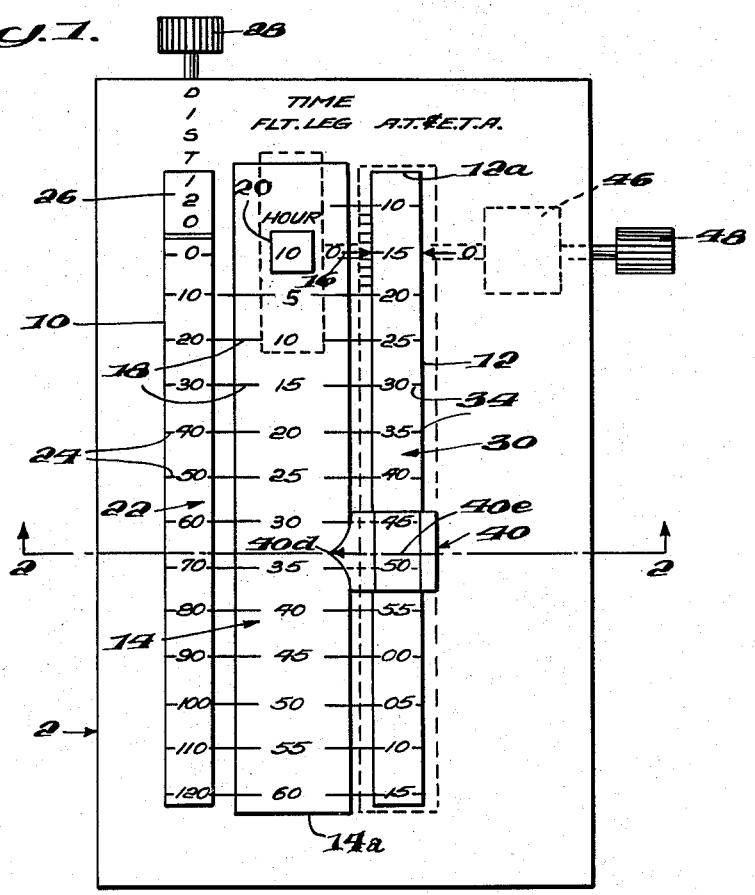
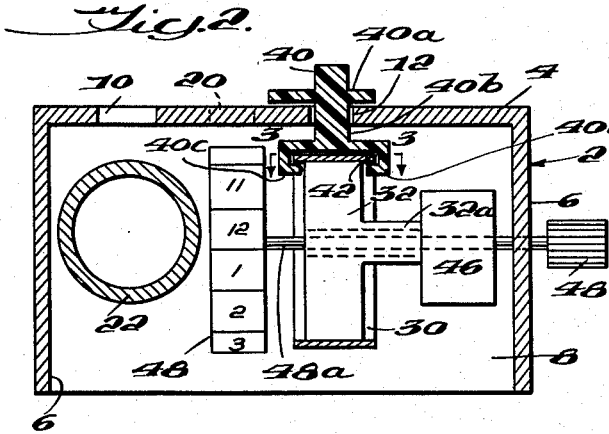
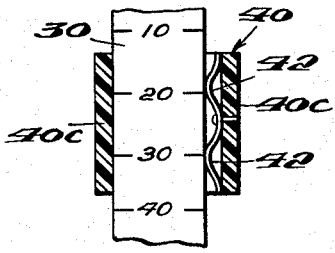
INVENTOR
RUDOLF GREINER,
BY
*Lawrence E. Laubscher*
ATTORNEY Dec. 3, 1963     R. GREINER     3,112,874
NAVIGATIONAL AID Filed Nov. 26, 1962     2 Sheets-Sheet 2

*Fig.4.*

INVENTOR
RUDOLF GREINER,

BY
Lawrence E. Laubscher
ATTORNEY 3,112,874
NAVIGATIONAL AID
Rudolf Greiner, Eichenweg 14, Langenthal,
Bern, Switzerland
Filed Nov. 26, 1962, Ser. No. 239,897
5 Claims. (Cl. 235—61)

This invention relates to an improved navigational aid for indicating, in addition to actual time, the instantaneous position and the estimated time of arrival of a vehicle following a predetermined course of travel between two points which are a known distance apart.

In the U.S. patent to Robert O. Du Pont, No. 3,037,693 of June 5, 1962, a navigational aid is disclosed that indicates continuously the time and estimated distance which an aircraft traveling a known flight leg is away from its destination, together with the estimated time of arrival at the destination. The patented apparatus includes a stationary flight time scale and a manually adjustable estimated time of arrival scale. These scales are arranged parallel with each other and contain time indicia of equal spacing and of the opposite sense. An indicator is provided that is driven at a uniform speed in one direction along a linear fixed path parallel with the time scales. At the commencement of a flight leg, the indicator is set to a position that is a function of the measured distance of the leg and estimated flight speed, and the ETA scale is set relative to the indicator and the flight time scale in accordance with actual time as indicated by an auxiliary time piece. While the known device performs quite satisfactorily, the need for auxiliary timing apparatus, and the attendant possibility of error in the initial setting of the ETA scale, are drawbacks affecting the utility and reliability of the navigational aid. The present invention was developed to avoid the above and other drawbacks of the known devices of the patented art.

Accordingly, one object of the present invention is to provide an improved navigational aid that is extremely reliable in operation and which includes clock means affording continuous indication of actual clock time and estimated time of arrival of a vehicle traveling along a given measured path between two stations. According to the invention, the clock means includes an "actual-time-in-minutes scale" that is continuously driven at a uniform speed to indicate actual time in minutes. Indicator means are provided that are driven by the clock motor drive means in the same direction and at the same rate of speed as the actual-time-in-minutes scale. In operation, upon commencement of a flight leg, the indicating means is initially set to a position spaced from the read-out point of the time-in-minutes scale by a distance that corresponds with the actual distance of the flight leg and the estimated flight speed to be averaged by the vehicle during travel along the leg. In the preferred embodiment of the invention, the indicating means includes an estimated time of arrival indicator that is slidably connected with the actual-time-in-minutes scale. Means are provided for resiliently biasing the indicator into frictional engagement with the scale so that the indicator is carried by the scale toward the actual clock time read-out point.

A more specific object of the invention is to provide a navigational aid including a stationary flight time scale having a read-out point (i.e., an origin); a speed distance cylinder rotatably mounted adjacent and parallel with said flight time scale, said cylinder bearing on its periphery a plurality of rows of distance indicia arranged parallel with said flight time scale, each of said rows consisting of equally spaced distance indicia the spacing of which is a function of a given flight speed and the spacing of the indicia of the flight time scale; an actual time-in-minutes scale continuously driven along a fixed linear path parallel with and adjacent said flight time scale, said actual-time-in-minutes scale bearing time indicia equal to and of the same sense as the indicia of said flight time scale; and indicating means driven parallel with, and in the same direction and at the same speed as, said flight time scale, said indicating means being settable to an initial position spaced from the read-out point of said flight time scale by a distance that is a function of the distance to be travelled between two stations and the speed to be averaged during that leg of travel.

A further object of the invention is to provide a navigational aid comprising an endless actual time scale continuously driven at a uniform speed past a stationary read-out point, an indicator slidably connected with said endless scale and settable to a position thereon remote from said read-out point, and means biasing said indicator into frictional engagement with said scale whereby said indicator will be carried by said scale toward said read-out point.

Other objects and advantages of the invention will become apparent from a study of the following specification when considered in conjunction with the accompanying drawing, in which:

FIG. 1 is a plan view of the navigational aid;
FIG. 2 in a sectional view taken along line 2—2 of FIG. 1;
FIG. 3 is a detailed sectional view taken along line 3—3 in FIG. 2; and
FIG. 4 indicates the information provided by the speed distance chart.

Referring to the drawing, the frame 2 of the navigational aid includes a plate 4, side walls 6 and end walls 8. Plate 4 contains a pair of parallel rectangular windows 10 and 12 between which is arranged a flight time scale 14. Scale 14 includes an origin 16 and equally spaced indicia 18 (shown in FIG. 1 for clarity as being graduated in 5 minute increments). Preferably, scale 14 is at least partially covered by a layer 14a of a transparent synthetic plastic material (for example, Lucite) upon the surface of which pencil marks may be made and may be subsequently removed by rubbing with the finger. Layer 14a is secured to the upper surface of plate 4 as shown. Hour opening 20 is provided in plate 4 opposite the origin of flight time scale 14.

Rotatably mounted (by journal means, not shown) below and parallel with first window 10 is a speed-distance cylinder 22. Peripherally mounted on cylinder 22 is a speed-distance chart (FIG. 4) containing a plurality of rows of distance indicia 24, the incremental spacing of which corresponds with a given flight speed 26 relative to the incremental spacing of the indicia of flight time scale 14. In the illustrated example, the row corresponding with a flight speed 26 of 120 m.p.h. indicates a distance of 120 miles for a time period of sixty minutes as read from flight time scale 14. In accordance with the teachings of the aforementioned Du Pont patent, the number and speed ranges of the distance rows provided upon the periphery of cylinder 22 correspond with the flying speed range of the aircraft with which the navigational aid is to be used. Knurled knob 28 affords means for manually rotating cylinder 22 abouts its longitudinal axis.

Endless actual-time-in-minutes scale 30 is mounted below and parallel with second window 12 as shown in FIG. 2. This scale, which is formed of a flexible, substantially non-expansible material (for example, light-gauge steel), is mounted at each end upon cylinders 32 that are rotatably connected with frame 2 (by journal supports, not shown) adjacent the ends of window 12. Cylinders 32 rotate about axes normal to the longitudinal axis of the window. Actual time scale 30 bears indicia 34 of equal spacing and of the same sense as the indicia 18 of flight time scale 14. In the illustrated embodiment, the total length of endless scale 30 is three times that of stationary flight time scale 14.

Slidably mounted in window 12 is an indicator 40 formed of a transparent material, such as Lucite, plexiglass, or the like. Indicator 40 is provided with lateral supporting flanges 40a that slidably engage the upper surface of plate 4, a central portion 40b that extends downwardly through window 12, and a pair of opposed, inwardly directed U-shaped channel portions 40c that receive the longitudinal edge portions of the upper run of endless actual time scale 30. The flange 40a that extends over flight time scale 14 is provided with a pointed indicating projection 40d. A fine opaque (black) read-out line 40e is formed in transparent indicator 40 and extends from the apex of projection 40d transversely across scales 14 and 30. Leaf spring means 42 are mounted in one of the U-shaped channel portions 40c of the indicator and serve to resiliently bias the indicator into frictional engagement with the scale in a manner analogous to the frictional engagement obtained between the movable indicator and the frame of a conventional high quality slide rule. Indicator 40 is freely movable in either direction longitudinally of window 12 and actual time scale 30.

Convention spring-powered clock mechanism 46 mounted within frame 2 continuously drives one of the time scale drums 32 via tubular shaft 32a. The other time scale drum 32 (not shown) constitutes a freely rototable idler. Clock mechanism 46 also drives hour drum 48 (via shaft 48a that extends coaxially through tubular shaft 32a) which is arranged below hour opening 20. Shafts 32a and 48a are driven, respectively, by clock mechanism 46 at rotational speeds which present an indication of actual time in "hours" and "minutes" in window 20 and on scale 30 opposite origin 16, respectively. Clock mechanism 46 is set and wound by conventional stem and knurled knob means 48.

Operation

Upon commencing a measured flight leg between first and second stations, the pilot rotates speed-distance cylinder 22 by means of knob 28 until the estimated flight speed 26 for that leg appears beneath window 10. From an accompanying conventional "en route map and radio navigational aid," the pilot determines the actual distance between the two stations and sets the apex of projection 40d of indicator 40 opposite the appropriate flight leg distance indicia 24 on cylinder 22 below window 10. A pencil mark is then made on scale 14 opposite indicator apex 40d. Assuming that clock mechanism 46 has been wound and correctly set, the actual time of departure from the first station appears in hours and minutes below opening 20 and on scale 30 opposite origin 16, respectively. Estimated time of arrival at the second station appears on scale 30 below indicating line 40e of indicator 40. The estimated time in minutes required for the flight leg is indicated on scale 14 opposite indicator apex 40d.

Actual time scale 30 is continuously driven by clock mechanism 46 in such a direction that its upper run travels toward origin 16 of scale 14. Owing to the frictional engagement between indicator 40 and scale 30 produced by spring means 42, after indicating line 40e has been set opposite the appropriate distance on cylinder 22, the indicator will be carried by scale 30 in the direction of origin 16.

Assume now that at a given time during the flight leg, the pilot is requested to provide his position. The instantaneous values of estimated distance and time away from the second station are presented opposite apex 40d and line 40 on cylinder 22 and scale 14, respectively. Estimated time of arrival is indicated on scale 30 opposite indicating line 40e, and actual clock time is indicated in hours and minutes in window 20 and opposite origin 16, respectively. In the illustration of FIG. 1, the pilot is advised that the estimated flight speed is 120 miles per hour, the distance and time from the terminal station are 68 miles and 33 minutes, respectively, the estimated time of arrival is 10:48, and the actual clock time is 10:15.

Assume now that at the moment of arrival at the second station, indicating line 40e is opposite origin 16. The pilot knows that the estimated flight time of 120 miles per hour was correct for the existing weather conditions and accordingly no adjustment of cylinder 22 is required for the next flight leg. The distance for the next leg is determined from the accompanying map and the operation described above is repeated.

Assume, on the other hand, that at the moment of arrival at the terminal station of the first flight leg, indicating line 40e had travelled beyond origin 16 by a time of 3 minutes as indicated by scale 14. The flight time required for the leg was greater than anticipated and accordingly the actual flight speed did not equal the estimated 120 miles per hour value. In order to determine average flight speed for the leg just flown, the pilot makes a pencil mark on scale 14 opposite point "37" (34 minutes plus 3 minutes) and rotates cylinder 22 by knob 28 until the distance of the leg appears in window 10 opposite point "37" on scale 14. The flight speed (26) actually averaged during the leg now appears in the upper portion of window 10, and the corresponding distance indicia is now used by the pilot for his calculations of the next flight leg.

On the other hand, if at the moment of arrival at the terminal station, indicating line 40e is short of origin 16 by 2 minutes as indicated by scale 14, the flight time was faster than anticipated and a pencil mark is made opposite point "32" (34 minutes minus 2 minutes) on scale 14. Cylinder 22 is then rotated until leg distance is opposite point "32," whereupon the flight speed actually averaged during the leg is presented at the top of window 10.

As indicated above, actual time scale 30 is continuously driven by the spring-powered clock mechanism 46. When the navigational aid is not in use (as for example, when the aircraft is on the ground) indicator 40 is carried by scale 30 to a stationary idling position in abutting engagement with the upper edge 12a of window 12, whereupon continuously driven scale 30 now travels relative both to plate 4 and indicator 40.

It is apparent that by the use of the present invention, the pilot is continuously advised, in a most reliable and clearly understood manner, of his distance to the next station, the number of minutes he is away from this station, actual time (in hours and minutes), and estimated time of arrival (in hours and minutes) at the next station. The navigational aid is operable in a simple, extremely reliable, readily understood manner without the necessity of any type of auxiliary time piece.

While in accordance with the provisions of the patent statutes I have illustrated and described the best form and preferred embodiment of the invention, it will be apparent to those skilled in the art that various modifications may be made in the apparatus described. For example, in place of the clock mechanism, other types of constant speed motors (for example, a battery powered electric motor) may be used equally as well. Furthermore, while I prefer to have the indicator driven directly by the actual time scale, it is also possible to drive the indicator by drive means including shaft 32a and friction clutch means. Other modifications may be made in the apparatus described without deviating from the invention set forth in the following claims.

What is claimed is:

1. A navigational aid, comprising
    a frame having a plate containing a pair of parallel, generally rectangular windows and provided with a stationary flight time scale adjacent and parallel with a longitudinal edge of at least one of said windows, said flight time scale having an origin and equally spaced time indicia extending therefrom;
    a speed-distance cylinder rotatably connected with said frame beneath, and parallel with the longitudinal axis of, a first one of said windows, said cylinder bearing on its periphery a plurality of rows of distance indicia arranged parallel with the axis of said cylinder, each of said rows consisting of equally spaced distance indicia the spacing of which is a function of a given flight speed and the spacing of the indicia of the flight time scale;

an actual time scale connected with said frame for movement relative to said plate, said actual time scale comprising an endless belt one run of which is below and parallel with said plate, said one belt run being also parallel with and beneath a second one of said windows, said actual time scale having an origin and indicia spaced in increments equal to, and of the same sense as, the spacing of the indicia of the flight time scale;

motor means connected with said frame for continuously driving said actual time scale at a uniform speed longitudinally of, and in one direction relative to, said second window;

and an indicator mounted for longitudinal sliding movement in said second window, said motor means being operable to drive said indicator solely in said one direction longitudinally of said second window and at the same speed as said actual time scale.

2. Apparatus as defined in claim 1 wherein said indicator is mounted for sliding movement relative to said one run of said actual time scale.

3. Apparatus as defined in claim 1, wherein said indicating means further includes spring means biasing said indicator into frictional engagement with said one run of said actual time scale, whereby said indicator is driven in one direction in said second window by said actual time scale.

4. Apparatus as defined in claim 3 wherein said actual time scale means is driven by said motor means at a rate to indicate actual clock time in minutes opposite the origin of said flight time scale; and further wherein said apparatus includes an hour drum rotatably mounted in said frame below an opening in said plate opposite the origin of said flight time scale, said hour drum being rotatably driven by said motor means at a rate to indicate the hour of actual clock time.

5. A navigational aid comprising
a frame containing a generally rectangular window and provided with a stationary flight time scale adjacent and parallel with a longitudinal edge of said window, said flight time scale having an origin and equally spaced time indicia extending therefrom;

an endless belt actual time scale connected with said frame for movement beneath and longitudinally of said window, said flight time scale having an origin and indicia spaced in increments equal to, and of the same sense as, the spacing of the indicia of the flight time scale;

motor means continuously driving said actual time scale in one direction relative to said window;

an indicator connected with said frame for movement longitudinally of said window;

and resilient means biasing said indicator into frictional engagement with said scale whereby said indicator is driven by said motor means in the same direction and at the same speed as said actual time scale, said indicator being settable to an initial position spaced from the origin of said flight time scale a distance that is a function of both the measured distance between two stations of a flight leg and the estimated speed to be averaged during the flight of said leg.

References Cited in the file of this patent
UNITED STATES PATENTS

| | | |
|---|---|---|
| 2,424,763 | Marschak | July 29, 1947 |
| 2,523,589 | Peterson | Sept. 26, 1950 |
| 3,037,693 | Du Pont | June 5, 1962 |